United States Patent
Zimmerman et al.

(10) Patent No.: US 11,609,316 B2
(45) Date of Patent: *Mar. 21, 2023

(54) INTEGRATED SONAR DEVICES AND METHODS

(71) Applicant: FarSounder, Inc., Warwick, RI (US)

(72) Inventors: Matthew Jason Zimmerman, North Kingstown, RI (US); Alexander Yakubovskiy, Warwick, RI (US); Nabin Sharma, Warwick, RI (US)

(73) Assignee: FarSounder, Inc., Warwick, RI (US)

( * ) Notice: Subject to any disclaimer, the term of this patent is extended or adjusted under 35 U.S.C. 154(b) by 613 days.

This patent is subject to a terminal disclaimer.

(21) Appl. No.: 16/706,384

(22) Filed: Dec. 6, 2019

(65) Prior Publication Data

US 2020/0116843 A1    Apr. 16, 2020

Related U.S. Application Data

(63) Continuation of application No. 14/764,777, filed as application No. PCT/US2014/015558 on Feb. 10, 2014, now Pat. No. 10,502,820.

(60) Provisional application No. 61/764,163, filed on Feb. 13, 2013.

(51) Int. Cl.
*G01S 7/52* (2006.01)
*G01S 7/521* (2006.01)
*G01S 15/87* (2006.01)
*G01S 15/89* (2006.01)
*G01S 15/96* (2006.01)
(Continued)

(52) U.S. Cl.
CPC ............ *G01S 7/521* (2013.01); *G01S 7/6272* (2013.01); *G01S 7/6281* (2013.01); *G01S 15/87* (2013.01); *G01S 15/8902* (2013.01); *G01S 15/96* (2013.01); *G01S 15/66* (2013.01)

(58) Field of Classification Search
None
See application file for complete search history.

(56) References Cited

U.S. PATENT DOCUMENTS

| 4,279,157 A | 7/1981 | Schomberg et al. |
|---|---|---|
| 4,611,313 A | 9/1986 | Ziese |
| 5,390,152 A | 2/1995 | Boucher et al. |
| (Continued) | | |

OTHER PUBLICATIONS

Extended European Search Report dated Sep. 6, 2016, for Application No. 14751004.4 (12 pages).

(Continued)

*Primary Examiner* — Hovhannes Baghdasaryan
(74) *Attorney, Agent, or Firm* — Brown Rudnick LLP

(57) ABSTRACT

The invention generally relates to sonar devices that integrate forward-looking sensors with down-looking echosounders, side scanning sonar, or both. The invention provides a sonar system that includes a forward-looking sonar device that operates in an integrated fashion with one or more other sonar devices so that a boater can have a reliable navigation tool while also using sonar for finding fish and other features on the seafloor. The forward-looking sonar can include a transducer array that takes a three-dimensional acoustic reading of the objects and seafloor ahead. The electronics that process the acoustic data can also process data from down-looking sonar, side-scanning sonar, or both and can integrate the information to present an expansive display in the boat, revealing the contents and the floor of the sea in front of, around, and under the boat.

20 Claims, 12 Drawing Sheets

(51) Int. Cl.
*G01S 7/62* (2006.01)
*G01S 15/66* (2006.01)

(56) References Cited

U.S. PATENT DOCUMENTS

| | | |
|---|---|---|
| 5,675,552 A | 10/1997 | Hicks et al. |
| 7,710,825 B2 | 5/2010 | Betts et al. |
| 2002/0071345 A1 | 6/2002 | Chiang et al. |
| 2003/0235112 A1 | 12/2003 | Zimmerman et al. |
| 2005/0007882 A1 | 1/2005 | Bachelor et al. |
| 2005/0099887 A1 | 5/2005 | Zimmerman et al. |
| 2010/0157736 A1 | 6/2010 | Riordan et al. |
| 2011/0202278 A1 | 8/2011 | Caute et al. |

OTHER PUBLICATIONS

International Search Report and Written Opinion dated Jul. 29, 2014, for PCT/US14/15558, filed Feb. 10, 2014 (16 pages).
International Search Report and Written Opinion dated Jul. 29, 2014, for International Patent Application No. PCT/US14/15558, filed Feb. 10, 2014 (23 pages).
Translation of Official Action from the Japanese Patent Office, dated Dec. 18, 2017, for Japanese Patent Application No. 2015-557157 (11 pages).
Translation of relevant parts of Japanese Laid-Open Publication No. 7-63852 (4 pages).

INTEGRATED SONAR DEVICES AND METHODS

CROSS-REFERENCE TO RELATED APPLICATION

This application is continuation of U.S. patent application Ser. No. 14/764,777, filed Jul. 30, 2015 (allowed as U.S. Pat. No. 10,502,820), which is a national stage entry of International Patent Application Number PCT/US2014/015558 with International Filing Date Feb. 10, 2014, which claims the benefit of, and priority to, U.S. Provisional Patent Application Ser. No. 61/764,163, filed Feb. 13, 2013, the contents of each of which are incorporated by reference.

FIELD OF INVENTION

The invention generally relates to boat sonar devices that integrate forward-looking sensors with down-looking echosounders, side scanning sonar, or both.

BACKGROUND

Boaters rely on sonar to navigate their boats through perils. Underwater rocks could sink a boat. If boats run aground in shallow water, the people onboard could be stranded. Sonar is used to detect explosive mines that are meant to sink and destroy ships. Sonar is also used in seafloor mapping and other geological and biological studies. Additionally, people use sonar to look for fish, shipwrecks, and other features of interest. Depending on which use is most important, a boater will choose the type of sonar that they want to install on their boat.

For example, a typical down-looking echosounder mounts on the bottom of a boat's hull and uses a narrow acoustic beam to scan the seafloor. By calculating the time for the sound to return, the echosounder can reveal the depth of the water as well as the presence and location of fish. In fact, many echosounders are sold as fishfinders.

However, where navigation and hazard avoidance is the goal, forward-looking sonar is used. Forward-looking sonar scans ahead of the vessel. These devices show the seafloor and obstacles ahead of the vessel. With some forward-looking devices, a single ping can generate a three-dimensional map of the area in front of the vessel.

To search the greatest area, side scanning sonar is used. As the name suggests, side-imaging units scan the sides of the boat and can produce detailed historical pictures out from the side of a boat. While side scanning sonar is not optimum for fish-finding or navigation, the breadth of coverage is good for finding reefs, shipwrecks, and other places where fish tend to congregate.

Unfortunately, once a boater decides to use an echosounder, forward-looking sonar, or a side scanner, the use of one compromises the ability to use any other. Not only are boaters understandably reluctant to drill the additional holes through the hulls of their boats, operation of the units actually interferes with one another. The sonic signal from an echosounder, for example, will overlap with, and thus muddy, the signal from a side scanner. So, if a boater chooses to use a fishfinder, then he must check if he has false alarms in or from forward-looking sonar due to the signals interference, which is quite a complicated task for the ordinary user who is not a sonar engineer.

SUMMARY

The invention provides a sonar system that includes a forward-looking sonar device that operates in an integrated fashion with one or more other sonar devices so that a boater can have a reliable navigation tool while also using sonar for finding fish and other features on the seafloor. The forward-looking sonar can include a transducer array that takes a three-dimensional acoustic reading of the objects and seafloor ahead. The electronics that process the acoustic data can also process data from down-looking sonar, side-scanning sonar, or both and can integrate the information to present an expansive display, revealing the contents and the floor of the sea in front of, around, and under the boat. Fish havens can be identified while schools of fish and even individual fish can be tracked—even as they pass from the field of one sonar unit to another—all while upcoming hazards are detected and avoided. The sonar transducers can be housed in a single enclosure, a transducer module. Even where the transducer module is the through-hull type, installation requires little changes to the boat and is easy. Since devices of the invention are easy to install and integrate signal processing from multiple sonar modalities, a boater can have true three-dimensional forward looking sonar fully integrated with down-looking capabilities, side-scanning, or both.

In certain aspects, the invention provides a sonar system that includes a transducer module configured to be mounted to a hull of a boat, which has housed within both a forward-looking sonar subsystem and a second sonar-subsystem that is configured to take a sonic image in a direction other than forward. The system also includes a processing module operably coupled to the forward-looking sonar subsystem and the second sonar subsystem as well as a display module connected to the processing module to display a picture giving an integrated view of information gathered by the forward-looking sonar subsystem and the second sonar subsystem.

In some embodiments, the second sonar-subsystem is a side-scanning sonar subsystem and the system also, further includes an echosounder subsystem housed within the transducer module. The transducer module can be provided in through-hull style of housing for mounting on a boat hull.

The forward-looking sonar subsystem may include a three-dimensional array. The processing module can be operated to provide forward looking derived bathymetry ahead of the sonar; to provide forward looking derived in-water targets ahead of the sonar; to provide side scan sonar derived imaging to the sides of the sonar; to provide echosounder derived bottom depth below the sonar; to provide echosounder derived in-water target detection below the sonar, or a combination thereof. The system may additionally, optionally include one more sensors capable of providing roll, pitch, and heading measurements of the transducer module. The processing module can use the roll, pitch, and heading measurements for fixed-frame-of-reference processing of sonar data.

Additionally, the system may optionally include a subsystem controller configured to operate the forward-looking sonar subsystem, the side-scanning sonar subsystem, and the echosounder subsystem without interfering with one another. The subsystem controller can perform such functions as maximizing the ping rate of the side scan sonar subsystem for a given side scan sonar listening period; synchronizing a transmission of the echosounder subsystem to a transmission of the side scan subsystem; alternating a transmit signal of the side scan subsystem between one or more orthogonal signals; alternating a transmit signal of the echosounder subsystem between two or more of the same signals used by the side scan sonar subsystem; maintaining a transmit signal of the echosounder subsystem orthogonal to a transmit signal of the side scan sonar subsystem; maximizing a ping rate of the forward-looking subsystem for a given listening period; providing a transmit signal of the forward-looking subsystem that is orthogonal to a transmit signal of the side scan and echosounder subsystems; other functions, or a combination thereof.

In some embodiments, transmit signals of the side scan subsystem and the echosounder subsystem are chirp signals and the chirp signals alternate between up and down chirps within the same frequency band. The transmit signal of the forward-looking sonar subsystem may alternate between two or more orthogonal signals. The transmit signal of the forward-looking sonar subsystem can be chirp signals that alternate between up and down chirps within the same frequency band.

The system may further include a sensor to provide one or more of roll, pitch, and heading, a device for measuring a static orientation of the transducer module while mounted on a vessel, or both. Preferably, the processing module is operable to measure a depth directly below the sonar system or even to measure multiple depths ahead of the sonar system. In some embodiments, the processing module is operable to use measured depth data to calculate a sound refraction index equivalent to sound speed profile (e.g., and to store the measured refraction index in a tangible, non-transitory memory). The system can use the measured refraction index to correct forward looking target measurements.

In certain embodiments, the system measures a close range depth using the forward-looking sonar subsystem, the echosounder subsystem, or both. The echosounder subsystem may include a down looking multibeam.

In some embodiments, the processing module is operable to receive geographic location input from a GPS unit and determine a geographic location of detected targets by means of the geographic location input. The processing module determines the location using one or more of a sonar sensor's vessel location relative to location sensor's vessel location; an orientation of the system relative to a fixed frame of reference; and a location of the detected targets relative to the sonar sensor. Further, the processing module can correlate targets detected using the forward-looking sonar subsystem with targets detected by side scan sonar subsystem by means of comparing the detected targets location relative to a geographic location of reference. The processing module may be operable to use the location of targets detected by the forward-looking sonar subsystem as inputs into the automatic detection algorithms used to process data from the side scan subsystem.

In some embodiments, the processing module is operable to correlate targets detected by the side scan subsystem to targets detected by the forward-looking subsystem. The display module highlights the correlated targets. The system compensates for vessel motion by means of input from a location sensor and input from a roll, pitch, and heading sensor. Additionally, the system automatically detects and tracks targets from data from the forward-looking subsystem across multiple transmissions.

Preferably, the processing module is operable to extract features about tracked targets including one or more of target speed, target movement direction, target strength, target shape, target depth and target centroid. The processing module is operable to correlate targets detected by forward-looking system with targets detected by the side scan sonar subsystem by means of comparing the detected targets location relative to a fixed frame of reference. The display module shows a display with side scan sonar targets highlighted based upon one or more features extracted from the forward looking data correlated to side scan sonar data. The feature used to highlight side scan sonar targets can be target speed.

The processing module can optionally calculate a depth below the vessel based on a beam range of the echosounder subsystem, a beam orientation of the echosounder subsystem, and reference to a fixed frame of reference as measured by a roll and pitch sensor capable of measuring instantaneous roll and pitch.

The processing module can model the seafloor surface that lies off to the side of the vessel using the echosounder subsystem and by making reference to a fixed frame of reference as measured by a roll and pitch sensor capable of measuring instantaneous roll and pitch.

Preferably, the echosounder transducer is shaped and oriented such primary side lobes are outside a main lobe and primary side lobes of the side scan subsystem and forward-looking sonar subsystem.

For physical construction, the forward-looking subsystem may use piezoelectric receiver elements, a PVDF material, or both. The system may have pre-amp electronics embedded in an array assembly and operable to minimize signal losses due to capacitive losses between the PVDF and the pre-amps. The system may include a unit for providing geographic location data indicating a vessel location.

Integration by the processing module can include making a mosaic of data from the side scanning subsystem and display the mosaicked data referenced to a fixed frame of reference. The processing module is operable to mosaic data from the forward-looking subsystem and display the mosaicked data referenced to a fixed frame of reference. In certain embodiments, the processing module is operable to process data from the forward-looking subsystem as echosounder data and present the processed data in a display in which the vertical axis is depth and the horizontal axis is range ahead of the vessel.

In certain embodiments, the display module displays a picture with two sections, in which one section represents the area from directly below the vessel forward to the farthest range of the forward looking subsystem and the other section represents time history of a single beam generated by the echosounder where the vertical axis represents depth below the vessel and the horizontal axis represents historical time. The display module may display a picture comprising one or more sections capable of displaying time history along a single beam where the vertical axis represents range along the beam direction from vessel and the horizontal axis represents historical time and the user can specify a particular beam from one or more of the sonar sub-systems with the inclusion of the side scan sonar and down looking echosounder sub-systems being optional. The picture can shows target having tracks created from at least a user-specified minimum number of transmissions or targets having user-specified track feature with values that fall within a user-specified range.

In related aspects, the invention provides a sonar system with a transducer module that has an echosounder subsystem and a side scan subsystem as well as a processor to derive images from the side scan sonar subsystem when the system is installed and operated on a vessel. The system can derive bottom depth from the echosounder subsystem and detect targets below the vessel. The system can include an integration controller to synchronize a transmission of the side scan subsystem and the echosounder subsystem, alternate a transmit signal of the echosounder subsystem and signal of the side scan subsystem, and maintain an orthogonal relationship between a transmit signal of the echosounder subsystem and signal of the side scan subsystem.

Preferably, the echosounder is down-looking and the system also has a forward looking subsystem. The system derives bottom depth from echosounder data, derives bottom depth ahead of the vessel from forward-looking sonar data, and calculates a sound refraction index equivalent to a sound speed profile. In some embodiments, the processor uses the refraction index to correct bottom depth as measured by the forward-looking subsystem.

The side scanning subsystem can measure bathymetry to the sides of the transducer module and the processor can use the refraction index to correct bottom depth as measured by the bathymetric side scan sonar.

Aspects of the invention provides a sonar system in which a transducer module includes a forward looking sonar unit and one or more sensors capable of measuring static roll and pitch integrated into the transducer module as well as a sensor mounted on the transducer module and operable to measure instantaneous pitch and roll. A processor is operable to derive bathymetric and target information ahead of a vessel from data from the forward looking sonar unit and provide the bathymetric and target information within a fixed frame of reference based on the measurements made using the sensor.

Preferably, the system includes a side scan sonar operable to make bathymetric measurements to the sides of the transducer module. The system mosaics bathymetric side scan sonar data relative to the fixed frame of reference. The system can include a display unit configured to display the bathymetric information from the forward looking sonar unit and the bathymetric information from the side scan sonar. The processor performs calculations to provide the bathymetric and target information within the fixed frame of reference for every transmission of the forward looking sonar.

DETAILED DESCRIPTION

The invention provides forward-looking sonar integrated with one or more sonar units that ensonify in directions other than forward. Each sonar unit may be an active sonar unit. Active sonars transmit and receive sounds. Integration includes making these sensors work together without unwanted interaction (e.g., acoustic interference).

Methods and devices for integrating sensor can include use of sensor that have different carrier frequencies; synchronization of transmit and receive operation to prevent time overlap; optimizing a beam pattern in space; other methods; or a combination thereof. In some embodiments, one or more sensor is designed from the scratch to minimize the interference in one or more of the possible domains: space (optimizing the beam patterns), frequencies and timing.

Integration may further include displaying data from multiple sensors together side by side, and enable the user to visually interpret the data. Another level of integration may operate by using the output data of the various sonars as complementary data and processing these data together. For example, the interferometric side scan sonar for seabed mapping can detect the bottom with wide swath coverage, but may have a gap in nadir area (straight below the keel). Down looking multi-beam sonar often used to fill this gap. In this kind of integration, the bottom detection signal processing in two sonars is not connected; the integration is performed at the output (bottom detections) data level only. However, in this implementation the user does not need to interpret the data; the final bottom image is fused automatically. The overall system performance can be improved by doing the integration in deeper level: inside the signal (not just output data) processing.

Figure 1:
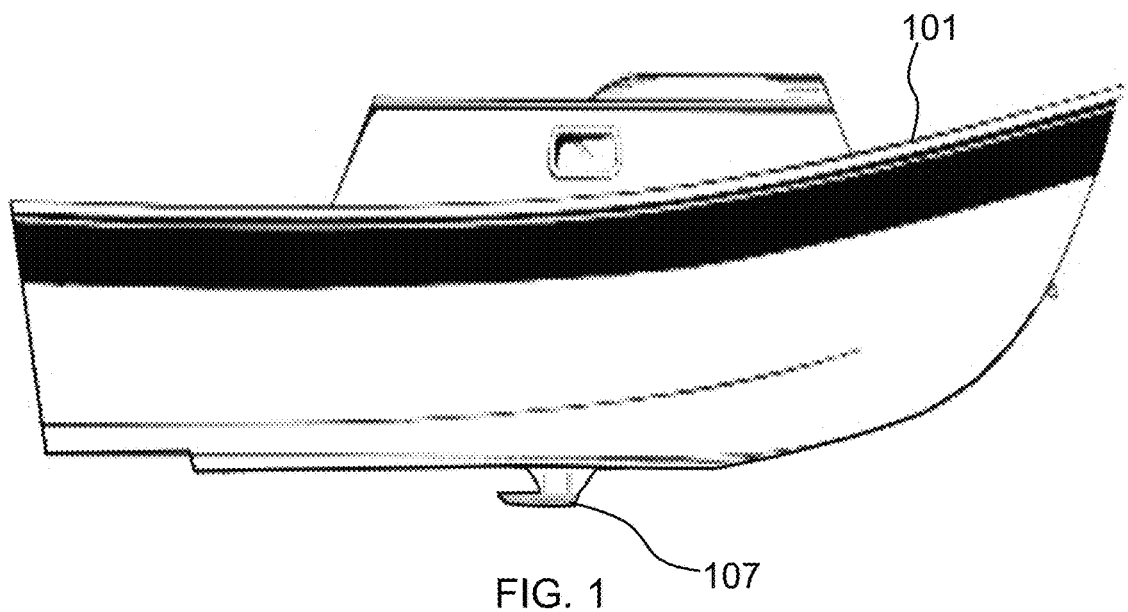
FIG. 1 depicts a boat with a sonar device.

FIG. 1 shows a vessel 101 with a transducer module 107 of the invention. Transducer module 107 can include one or more sonar transmit or receive transducers and may optionally include some or all of the sonar processing electronics. Preferably, units within transducer module 107 are coupled to a display unit accessible within vessel 101 by an operate. A sonar system with transducer module 107 may be used for a variety of purposes including, for example, seafloor surveys, mine detection, and recreational pursuits such as fishing.

Figure 2:
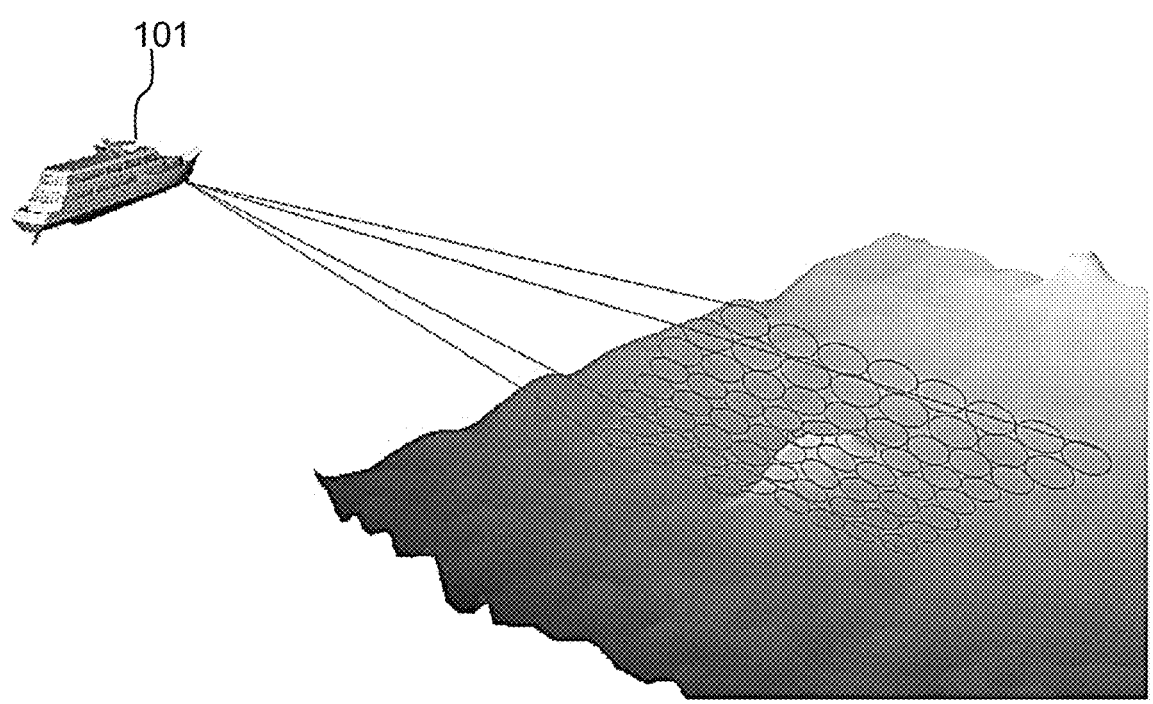
FIG. 2 shows three-dimensional forward looking sonar in operation.

FIG. 2 depicts vessel 101 conducting a seafloor survey. Seafloor surveys can include seabed mapping (geological survey) or seabed type/habitat classification (biological surveys). Prior art systems required a boat to cover the survey area by many zigzag runs, so the whole process was time-consuming. Systems and methods of the invention combine sonar data to improve the bottom coverage (swath) of each run, minimizing the number of runs, and process data to simultaneously extract depth and classification data.

Mine hunting is similar to the seafloor surveys, but with intention to find the mines, which are the small object with poor acoustic reflectivity. Mine hunting may involve use of a remotely operated vehicle (ROV) that includes a sonar device of the invention. Data can be streamed from the ROV to vessel 101, which operates as a mother ship command-and-control center.

Systems and methods of the invention provide several functions for recreational pursuits. Sonar can be used to detect dangerous shallows and obstacles ahead of the boat 101 for safety. A sonar system can be used for fish detection, and can reach a great distance around the boat (not just below the keel). Systems and methods of the invention can further be used to detect "fish haven" objects, where there may be a lot of fish (like shipwrecks, rock piles, reefs).

As particularly suited for recreational pursuits, systems of the invention are small, affordable, and easy to install. An insight of the invention is that boat owners are reluctant to buy and install multiple separate units to achieve multi-purpose sonar. Devices of the invention include underwater components with good hydro-dynamic properties. The devices are small to minimize drag forces. Further, operation of inventive devices minimizes the time of running the boat while looking for the "fish haven" objects. Since sonar systems presented herein include forward-looking sonar integrated with other sonar, it is possible to find interesting objects using forward looking sonar with wide field of view, and then look at the object with side scan or down-looking sonar. Additionally, systems of the invention minimize the impact of sound propagation in non-uniform sound speed profile environment, which can displace the depth estimation and the target position estimation.

Sonar devices of the invention overcome prior art limitations in that the inventive devices can have side scan or echosounder integrated and can use forward-looking sonar coordinated in frequency, time, or space with side scan or echosounder as part of an integrated system. Unlike prior art systems, which merely create a single 2D slice per ping and cannot create a 3D bottom with a single ping, devices of the invention can create a 3D bottom image with a single ping. The 3D forward-looking capability is integrated with side scan sonar, echosounder, or both.

Other severe limitations in prior art systems are that generated bottom and obstacles data are not true 3D, except in certain stand-alone devices by FarSounder and Echopilot. Prior art devices can only generate fish data that is not true 3D but is instead the historical data behind the boat, derived from the low level down looking multibeams. Finding fish haven objects with prior art side-scanning devices requires a boater has to spend time driving the boat in a "survey-style" path. Prior art side-scanning devices are poor fish-finders. In contrast, the invention offers an integration exploration sonar for marine vessels.

Figure 3:
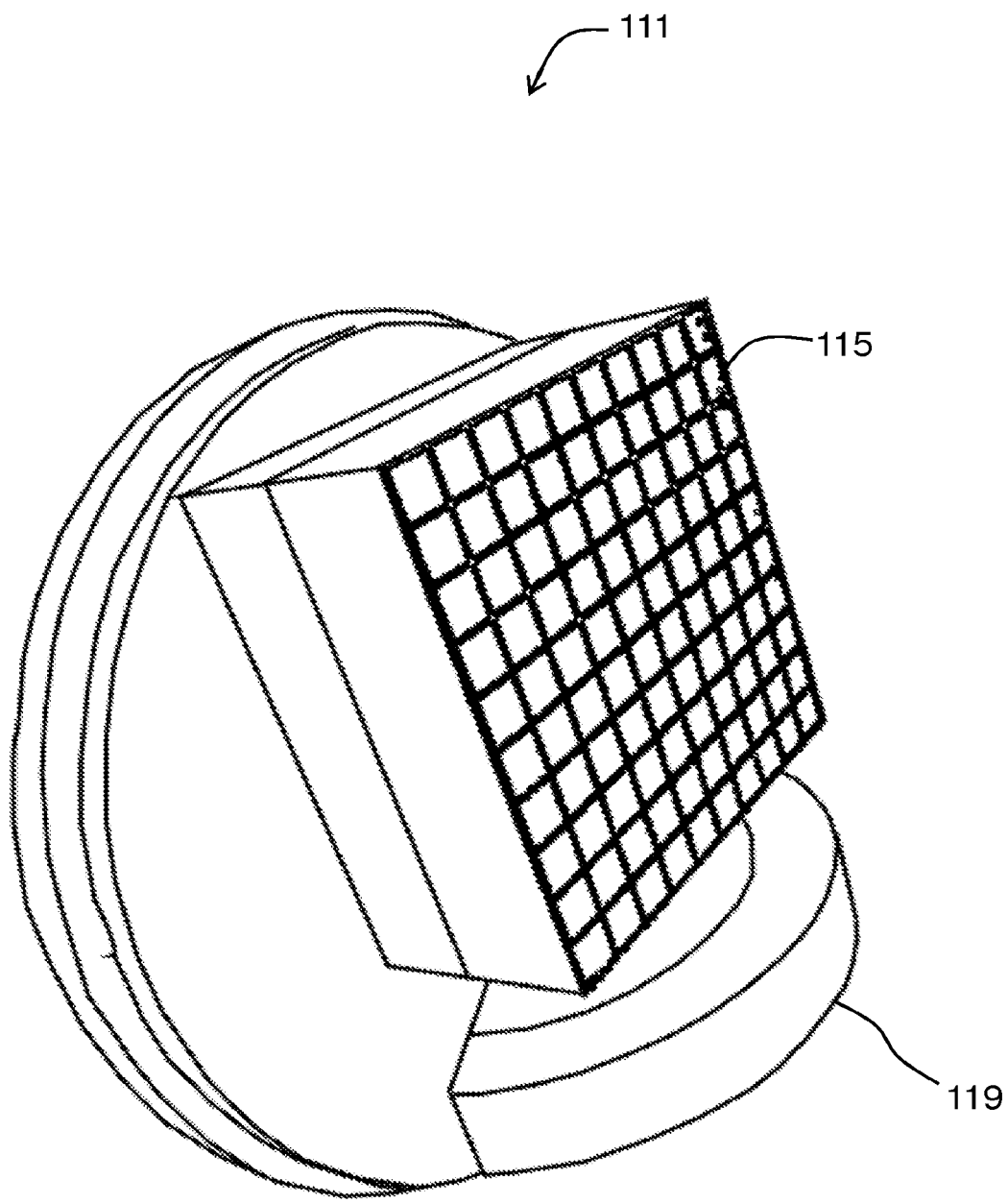
FIG. 3 presents a three-dimensional forward looking sonar array.

FIG. 3 depicts a true 3D forward looking sonar subsystem 111 according to certain embodiments. Preferably, at least one forward looking sonar subsystem 111 is included with transducer module 107. Transmit device 119 and receive array 115 may be located in the transducer module 107 or external to the transducer module. Due to receiver capacitance properties receiver preamps may be located close to each receiver element (e.g., optionally within transducer module 107). Due to the receiver channel count, the rest of the receiver electronics are most likely located in the transducer module 107. This reduces the number of individual conductors needed to extend from transducer module 107 to a processor module. The forward looking subsystem 111 should be capable of generating a 3 dimensional image of the sea floor ahead of the vessel with a single ping. In the preferred embodiment of the invention, the forward looking subsystem 111 receive array 115 consists of a 2 dimensional array with elements oriented such that the array has both vertical and horizontal directivity. In one embodiment of the invention, traditional beamforming is utilized in both the vertical and horizontal directions. In another embodiment, beamforming is utilized in the horizontal direction and interferometry is used in the vertical direction. In one variation of this embodiment, the receiver elements are shaped such that they are longer in the vertical orientation than the horizontal orientation. In one variation of the above embodiments, the receiver array is conformal to a non-flat shape. A 3D sonar system is described in U.S. Pat. No. 7,035,166 to Zimmerman, the contents of which are incorporated by reference.

In the preferred embodiment, the transmit transducer 119 is separate from the receive array 115 and has horizontal and vertical beampatterns large enough that a single transmission can ensonify the entire volume of interest ahead of the vessel and that this volume of interest corresponds to the entire vertical and horizontal coverage of the receiver system. In one variation of this embodiment, the transmitter consists of two or more horizontal rows such that the transmitted beampattern can be steered in the vertical direction by the use of standard phased or time delayed beam steering. Forward-looking subsystem is preferably housed within a transducer module 107.

Figure 4:
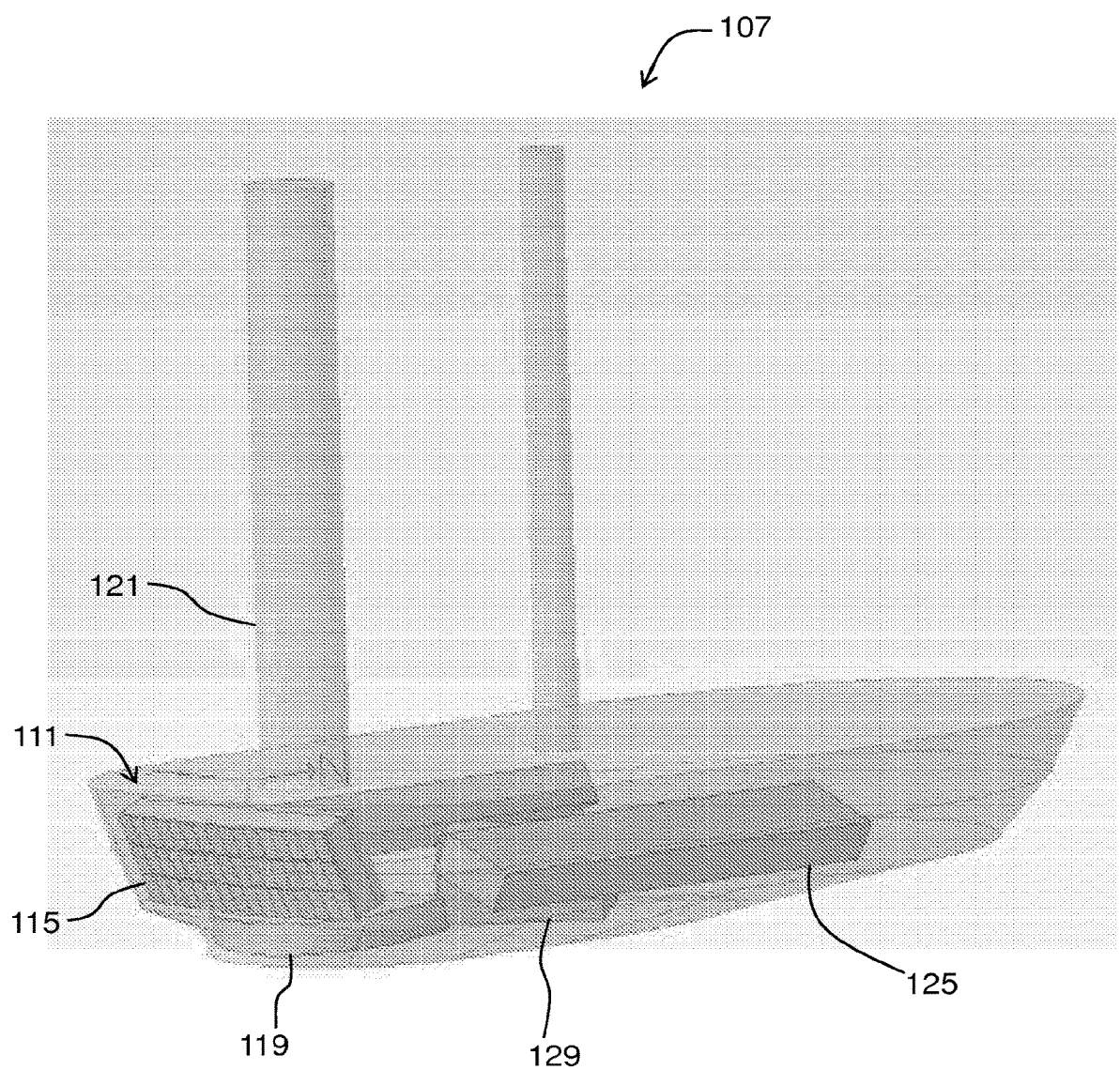
FIG. 4 shows a transducer module according to certain embodiments.

FIG. 4 depicts a transducer module 107 according to certain embodiments. One or more post 121 extends from module 107 to carry connections from the sonar subsystems to associated electronics. Here, module 107 is shown as a through-hull mountable transducer module, although other form factors (such as bracket-mounted or tow-behind) are within the scope of the invention. Module 107 also optionally includes one or more of a side scanning sonar subsystem 125, an echosounder subsystem 129, or a combination thereof. Preferably, transducer module 107 is provided in a hydrodynamic form-factor to minimize drag.

Figure 5:
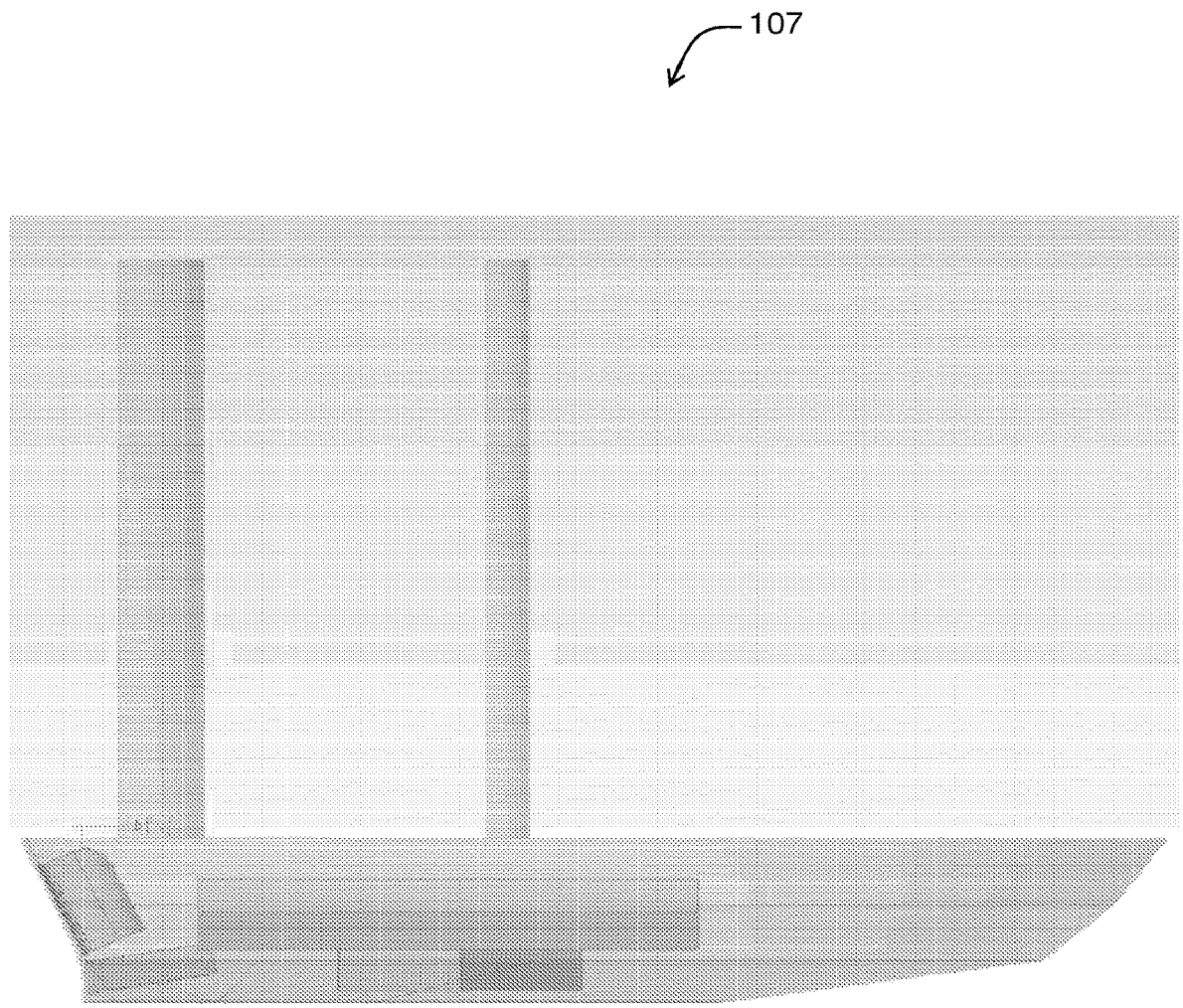
FIG. 5 gives a side view of the transducer module shown in FIG. 4.

FIG. 5 gives a side view of module 107. A sonar system will generally include electronics for information processing. Any or all of the electronic or information processing subsystems may be mounted within module 107. Preferably, subsystems of the invention will be operably coupled to a display unit for use by a boater on boat 101.

Figure 6:
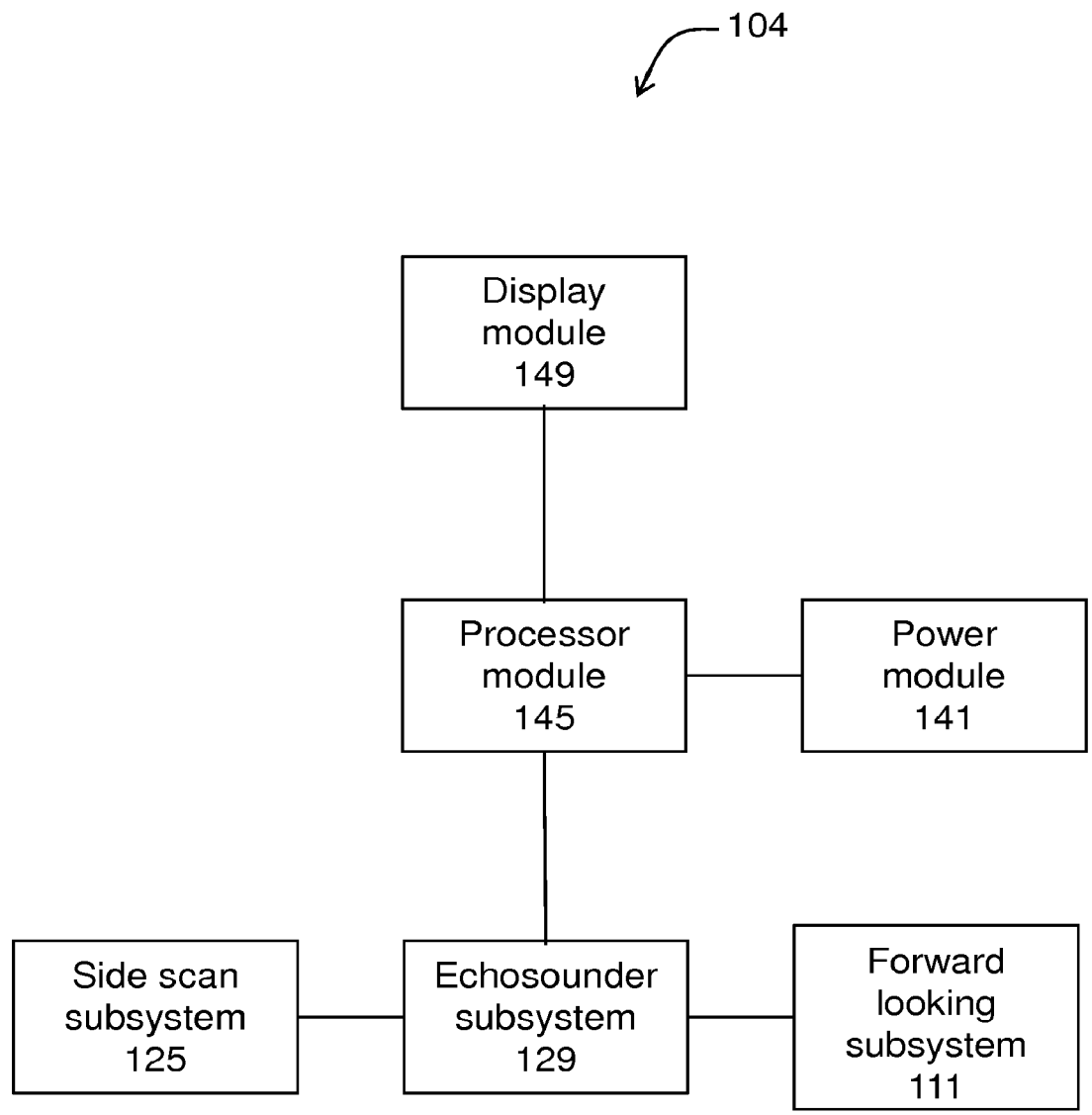
FIG. 6 diagrams components of a sonar system.

FIG. 6 diagrams components of a sonar system 104. Sonar system 104 includes at least one forward looking sonar subsystem 111 and a display module 149. Forward looking subsystem 111 cooperates integrally with one or more of side scanning subsystem 125, echosounder subsystem 129, or both. A processing module 145 includes at least on processor (e.g., a microchip) and preferably includes a tangible, non-transitory computer memory. Subsystems and modules of system 104 receive power via a power module 141.

Integration of the forward looking sonar data with other system modules at all levels is a key feature of the invention. The integration spans all the way from transducer assemblies in forward-looking subsystem 111 and any of side scanning subsystem 125 and echosounder subsystem 129 to user interface and visualization. Systems and methods of the invention provide true 3 dimensional forward looking sonar imaging with bathymetry ahead of the vessel and detection of in-water targets at navigationally significant ranges with a single ping. The invention further provides side scan information in either a bathymetric/imagining combination or imaging only configuration; downlooking depth and fish finding capabilities; or both. Transducer module 107 may have a through hull configuration with options for either displacement or planing hull adapters. Integration among modalities (forward, side, and down-looking) is provided in a coordinated manner such that the individual systems do not interfere with one another. System 104 provides automatic detection of in-water targets; automatic correlation of targets detected by forward-looking subsystem 111 to targets detected by side scan subsystem 125 or echosounder subsystem 129; automated alarm for possible collision with targets ahead of the vessel; the ability to reference all sensor data to a fixed frame of reference; methods for calibrating transducer module installation orientation relative to external roll, pitch, and/or heading sensors; methods for processing 3 dimensional forward looking sonar data to measure bathymetry ahead of the vessel; or a combination thereof. Methods for target detection and classification are discussed in U.S. Pat. No. 7,916,933 to Schwartz, the contents of which are incorporated by reference. Optionally, the invention also provides: an innovative method for processing 3 dimensional forward looking sonar data and optionally echo sounder data to correct for depth errors due to refraction through the water; forward looking depth sounder information; forward looking multibeam depth information; target features from side scan and forward looking sonar sensors for use in surveys including target classification; input from roll, pitch, heading, and geographic position sensors capable of providing measurements while the vessel is in motion; or a combination thereof.

Forward looking subsystem 111 along with one or more of side scanning subsystem 125 or echosounder subsystem 129 are preferably integrated into an acoustic system in transducer module 107. Operation of these subsystems is integrated so that no subsystem must have a severely limited physical directivity nor is time multiplexing of the subsystems strictly required. Transducer module 107 can be compact, can have any desired ping rate, and do not require an end user to mentally "integrate" results from multiple unrelated sonar systems. Integration methods that may be adapted for use with the invention are discussed in U.S. Pat. No. 8,300,499 to Coleman; U.S. Pat. No. 5,537,380 to Sprankle; U.S. Pat. No. 5,390,152 to Boucher; and U.S. Pub. 2010/0157736 to Riordan, the contents of each of which are incorporated by reference.

In a preferred embodiment, echosounder subsystem 129 hardware is included in the transducer module 107. The transmit and receive electronics may be located in the transducer module or external to the transducer module. The echosounder transducer(s) are pointed downward. In order to keep the echosounder's energy from interfering with the side scan and forward looking sonar, it is necessary to have a narrow beam. Traditional simple echosounders are built from circular disc transducer elements which have a beampattern which is symmetrical about the axis normal to the disc.

In a particular embodiment of the invention, for a given frequency, a transducer element with mechanical shading may be used. For example a quadrilateral shape can be employed with corners facing in the along sonar/cross sonar directions. This would force peak side lobes to be normal to the faces between the corners. If a diamond shape is used, then the peak side lobes can be steered to be outside the field of view of the forward looking sonar and side scanning sonar (see, e.g., FIGS. 7 and 8).

In certain embodiments, side scan sonar subsystem 125 is included in the transducer module 107. The transmit and receive electronics may be located in the transducer module or external to the transducer module. The side scan sonar may be of the imaging type with a single receiver element per side or the side scan sonar may be of the bathymetric/imaging combination style with multiple transducers configured as known in the art.

Subsystems of the invention can be installed in useful orientations and orientations of components of the invention can be described by making reference to a vertically-oriented reference plane P that bisects vessel 101 in a longitudinal direction when vessel 101 is held in an upright position (e.g., floating without motion on still water).

Figure 7:
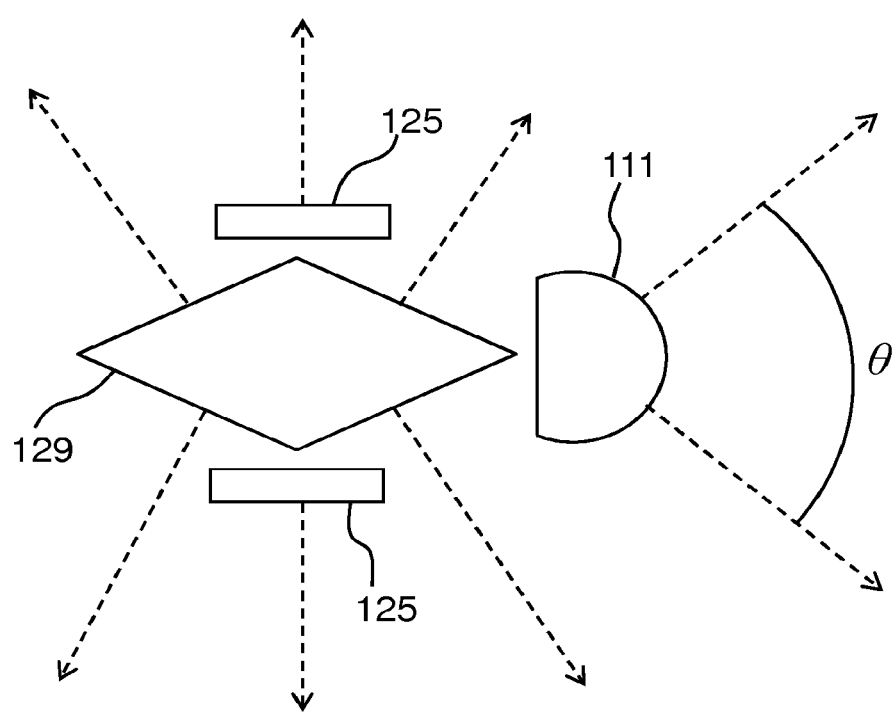
FIG. 7 shows an arrangement of transducers.

FIG. 7 depicts an arrangement of subsystem transceivers according to certain embodiments. Forward-looking subsystem 111 directs sound signals in a forward direction bounded in lateral extent by an angle theta (θ) preferably about 90°. Preferably, theta is bisected by the reference plane P when transducer 107 is installed. Side scan subsystem 125 preferably includes at least two sonic transducers, each oriented to transmit or receive sound that propagates along a normal to reference plane P, as shown in FIG. 7. Echosounder subsystem 129 can transmit or receive sound that propagates in directions intermediate to sound transmitted or received by forward looking subsystem 111 or side scanning subsystem 125.

One of the primary limitations to prior art multi-modal sonar is the way the various sub-systems are synchronized and coordinated when located closely on a single body. These limitations do not allow for maximum side scan and echosounder ping rate to be used with the maximum forward looking sonar ping rate when the sonars' frequencies are low enough to allow for target detection and navigationally significant ranges. This invention overcomes these limitations by synchronizing and coordinating the sub-systems' beampattern footprints, operational frequencies, and ping rates simultaneously.

Figure 8:
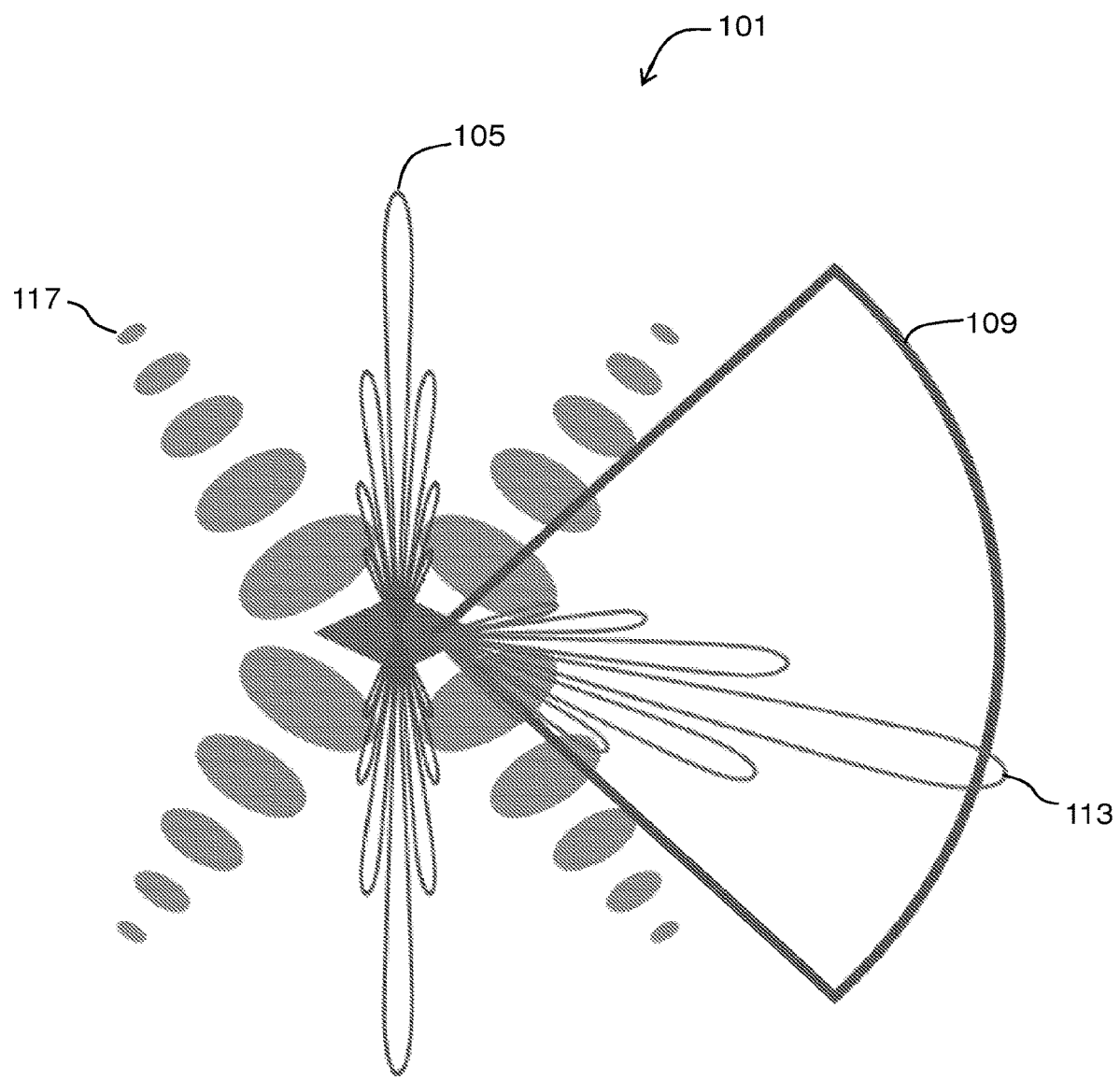
FIG. 8 maps a pattern of sonar beams.

FIG. 8 depicts beampatterns of forward looking subsystem 111, side scanning subsystem 125, and echosounder subsystem 129. Preferably, echosounder subsystem 129 is a down-looking sonar modality. In a preferred embodiment, echosounder subsystem 129 generates a echosounder beampattern 117 that is narrow enough not to overlap the side scan beampattern 105 or forward looking beampattern 113. In the case where the side lobes cannot be suppressed in all direction, the echosounder can be mechanically shaded such that the peak side lobes are steered outside of the other sub-systems' footprints.

In the preferred embodiment, the side lobes of side scan beampattern 105 face outward, perpendicular to the direction of vessel travel and normal to reference plane P. The side lobes in the horizontal should be small due to the aperture of the side scan transducer. The side lobes in the vertical may have some minor overlap with the down looking echosounder.

In the preferred embodiment, the main lobe of the forward looking beampattern 113 is wide in both the horizontal and vertical directions with receiver directivity covering at least the entirety of the transmitter's main lobe. Forward looking beampattern 113 can be steered to cover the entirety of the forward looking sonar field of view 109. Steerable forward scanning sonar is discussed in U.S. Pat. No. 5,675,552 to Hicks, the contents of which is incorporated by reference. The side lobes of forward looking beampattern 113 preferably do not correspond to any of echosounder beampattern 117. In one embodiment of the invention, the forward looking subsystem 111 is angled such that side lobes of beampattern 113 in the vertical do not overlap with the vertical side lobes of an individual receiver beam when the receiver beam is steered downward. The transmitter may be physically pointed in a slightly downward orientation relative the receiver array. Or the transmitter's main lobe may be steered via standard phase or time delay techniques.

In some embodiments, the side scan subsystem 125 and echosounder subsystem 129 operate in the same frequency band. Each system transmits signals with strong orthogonally to the other. In one embodiment, a frequency modulated signal known as a chirp or sweep is used with one system transmitting an up chirp while the other system transmits a down chirp. Should the footprint or side lobe footprint from the side scan overlay with part of the echosounder's footprint or side lobe footprint, the signals can be differentiated via match filtering.

In one variation of the above embodiment, the side scan and echosounder transmit at the same time. In another variation of this embodiment, the direction of the chirp alternates with each transmission such that consecutive pings from the side scan always alternate chirp directions, consecutive pings from the echosounder always alternate chirp directions, and concurrent pings from the side scan and echosounder are always in opposite chirp directions. By alternating the chirp direction in consecutive pings, match filtering for the current ping's chirp direction will filter out echoes from large targets beyond the maximum listening range of the side scan sonar from the previous transmission.

In the preferred embodiment of the invention, the forward looking sonar operates in a frequency band that is distinct from the frequency band of the echosounder and side scan sonars. In one embodiment of the invention, consecutive forward looking sonar transmissions use orthogonal signals. In a variation of this embodiment, the forward looking sonar transmits chirp signals with the chirp direction alternating between consecutive transmissions. By alternating the chirp direction in consecutive pings, match filtering for the current ping's chirp direction will filter out echoes from large targets beyond the maximum listening range of the forward looking sonar from the previous transmission. Forward looking sonar is further discussed in U.S. Pat. No. 7,889,600 to Thompson; U.S. Pat. No. 7,606,114 to Bachelor; U.S. Pat. No. 7,355,924 to Zimmerman; U.S. Pat. No. 7,035,166 to Zimmerman; U.S. Pat. No. 6,842,401 to Chiang; U.S. Pat. No. 5,530,680 to Whitehurst; and U.S. Pub. 2005/0007882 to Bachelor, the contents of each of which are incorporated by reference.

In the preferred embodiment, the side scan subsystem 125 and echosounder subsystem 129 transmit at the same time. The maximum ping rate for these two sub-systems is limited by the two way travel time for the sound waves to travel the maximum of the ranges selected for these two sonars. Footprint directivity and signal orthogonally will be relied upon to prevent interference between these two sub-systems.

In the preferred embodiment, the forward looking subsystem 111 will transmit at a rate and time that is independent from the side scan and echosounder. Footprint directivity and signal orthogonally will be relied upon to prevent interference between these two sub-systems.

All transducers of the subsystems are preferably packaged in a small, streamlined body, i.e., transducer module 107, sometimes known as a gondola. To be suitable for small vessels, transducer module 107 should be as small as possible. This means that the various transducers will be packaged close together. Therefore, they various acoustic subsystems are strongly coordinated and synchronized.

In the preferred embodiment, mechanical vibration dampening material is used to mount the receiver transducers to the gondola package. This allows the gondola to be rigidly mounted to the hull of the vessel (see FIG. 1) and still mitigate mechanical vibration noise from entering the receivers' signals. In the preferred embodiment, receiver arrays should be manufactured in such a way that mechanical cross talk between elements is minimized.

Figure 9:
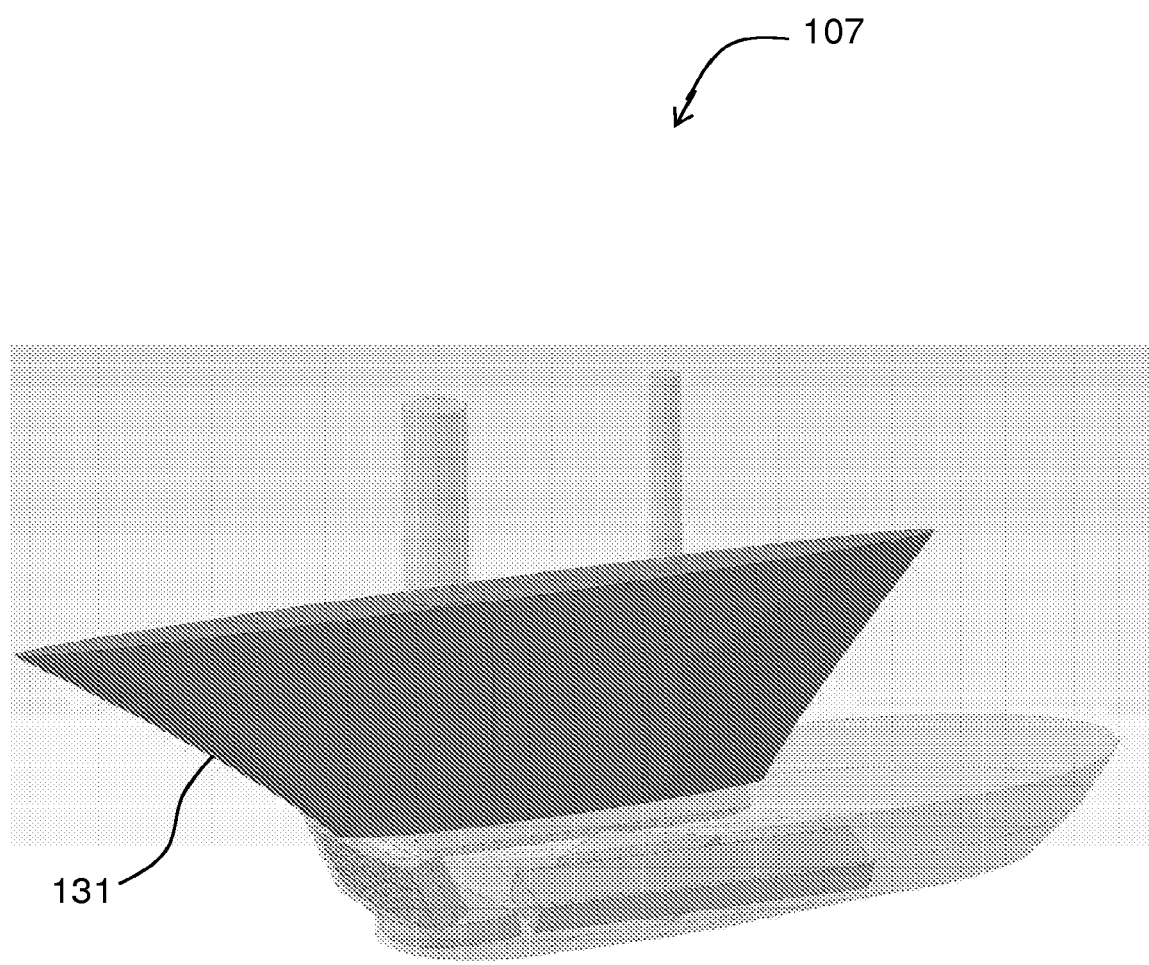
FIG. 9 illustrates a sonar device with a fairing.

In the preferred embodiment, transducer module 107 is attached to the vessel via a through hull installation (see FIG. 9 and FIG. 1). Through-hull attachment is described in U.S. Pat. No. 5,700,172 to Ousley and U.S. Pat. No. 5,526,765 to Ahearn, the contents of each of which are incorporated by reference. Transducer module 107 includes a conduit 121 (FIG. 4) that penetrates the hull of vessel 101. Conduit 121 of transducer module 107 is water proofed at the hull using standard sealant techniques. The top of the conduit offers cable entry/exit. In the preferred embodiment, the transducer module is installed from the outside of the vessel, oriented such that the front of the transducer module it is facing forward. The transducer module should be mounted deep enough that the hull does not block the sonars' fields-of-view. A spacer may be included to hold the transducer module below the hull, optimize hydrodynamics, or both.

FIG. 9 shows a fairing 131 operating as a spacer to space transducer module 107 away from the hull of vessel 101. As typical with other through hull mounted sensors, fairing 131 can be cut to match the dead rise of the hull. The fairing block is shaped appropriately to minimize drag. For displacement hulls, it is recommended that transducer module 107 be close to the hull. For planing hulls, it is recommended that module 107 be lowered deeper below the hull to ensure that the sonar sensors are below any turbulent water/air boundary later near the hull.

In order to associate the sonar data to a fixed frame of reference (such as the earth), it is useful to measure the roll, pitch and heading of the sonar sensors relative to the fixed frame of reference. This requires knowing the fixed orientation of the directivity of every receiver relative inside the transducer module and then measuring instantaneous roll, pitch, and heading of the transducer module relative to during the acquisition period of each sonar sensor. Processing methods known in the art can then be used to orient the received data relative to the fixed frame of reference.

In order to measure the instantaneous roll, pitch, and heading of the transducer module, a roll, pitch, and heading sensor must be installed with a fixed orientation relative to the transducer module and calibrated relative to the fixed frame of reference. In one embodiment of the invention, a roll, pitch and heading sensor is included in the transducer module assembly to measure the transducer module's orientation directly.

Integrating a device capable of measuring orientation on a dynamic moving vessel may not be necessary in some cases as such a device may already be installed on the vessel. In another embodiment of the invention, a roll, pitch and heading sensor fixed relative to the transducer module external to the transducer module can be used in conjunction with a known orientation difference between the sensor and the transducer module.

In many cases, this can be difficult to measure manually. The cost of a device capable of measuring orientation on a dynamic moving vessel may be expensive relative to the cost of a sensor capable of measuring orientation of a static platform. In another embodiment of the invention, an inexpensive sensor capable of measuring static orientation is integrated into transducer module 107. While vessel 101 is out of the water and in a fixed orientation, after transducer module 107 is installed and an external device capable of dynamic orientation measurements is installed, the static orientation sensor inside transducer module 107 can be used to measure the orientation of transducer module 107 relative to the external dynamic sensor which is currently in a fixed static orientation. These measurements can then be applied as offsets between the external sensor and the orientation of transducer module 107.

In another embodiment of the invention, the dynamic measurement of the roll, pitch and heading is split between a sensor internal to transducer module 107 and one or more sensors external to transducer module 107.

The invention additionally provides systems and methods for signal processing. In some embodiments, forward looking sonar uses beamforming for horizontal angles and interferometry for vertical angles. Reference bottom depth can be used to define forward looking bottom map detection gate. This is common in 2D multi-beam processing. However, the gate is manually defined by a trained operator. In the invention, the reference bottom is derived from integrated echosounder subsystem 129, forward looking subsystem 111 operated in echosounding mode, or both. The reference bottom is generated from a robust bottom detection algorithm that operates well on echosounder data and steep vertical steer angle data from forward looking subsystem 111. The reference bottom is calculated by averaging a few recent pings from these reliable beams.

Automatic detection of targets in forward looking sonar can be used to associate targets in side scanning. If an in-water target can be tracked in forward looking sonar, then it is probably big enough to be of interest to boaters and is automatically highlighted in a side-scanning image. Additionally, a side-scanning image can be used in conjunction with forward looking sonar for target classification. This can be useful for fish stock assessment as standard prior art procedures use downlooking sonars only.

Because forward looking sonar has large single ping coverage, tracked targets can be analyzed temporally to measure target speed. Targets can then be classified by speed. Targets tracked from forward looking sonar and correlated to side scan images can be highlighted as a function of speed. For example, only moving targets could be highlighted in the side scan sonar data. Since traditional side scan sonars are 1D and do not have any temporal information, prior art classification methods of side scan data cannot take advantage of temporal queues. The invention described herein can. Additionally, any other classification feature or group of classification features derived from the forward looking data can be used as filters to automatically highlight correlated targets in the side scan. Optionally, some or all sensor data can be oriented geographically to a fixed frame of reference and one or more data types can be mosaicked and displayed to the user as is common in the art.

In one optional feature of the invention, data from forward looking subsystem 111 is processed such that it can provide an output that is more informative than prior art forward looking echosounders. The forward looking receiver is capable of beamforming in both horizontal and vertical directions. For a given horizontal direction (vertical slice), we have many overlapping beams that span the selected vertical slice.

Figure 10:
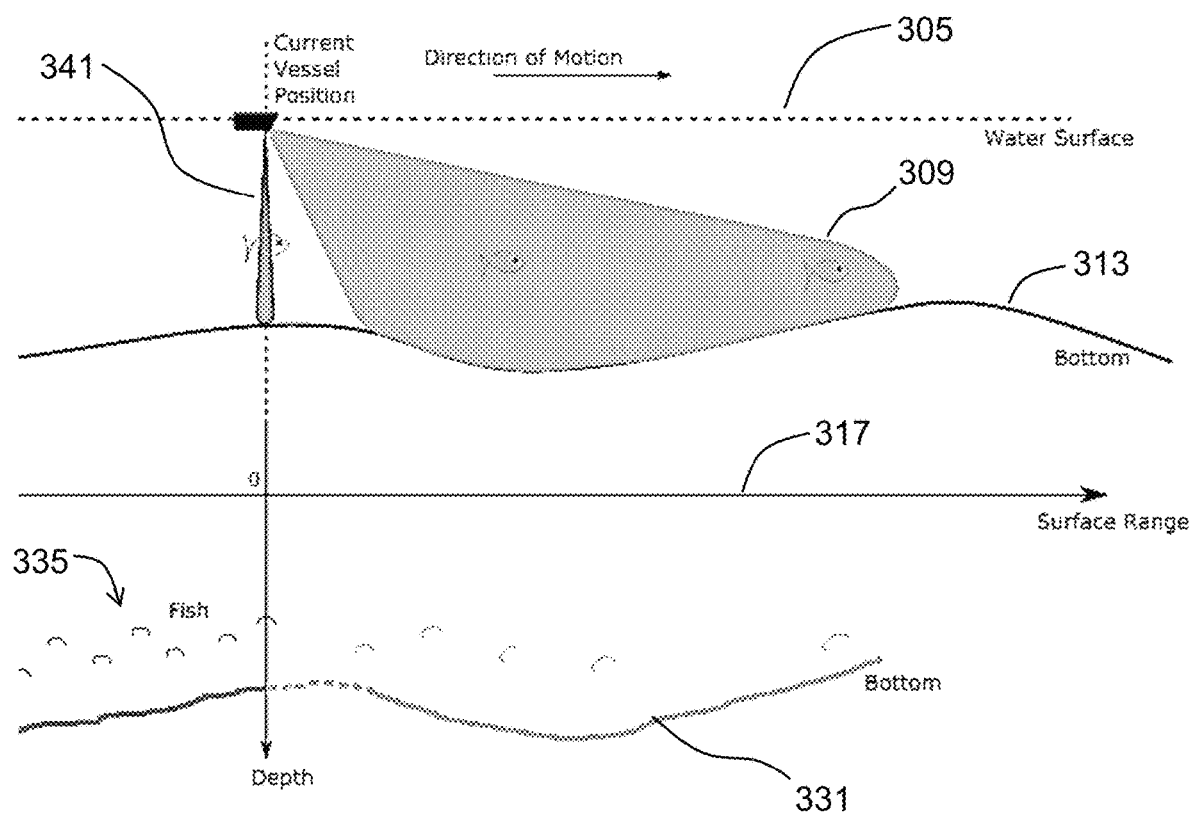
FIG. 10 demonstrates integration of forward-looking and down-looking echosounders.

FIG. 10 demonstrates the integrated operation of echosounder subsystem 129 and forward looking subsystem 111 (i.e., operated in echosounder mode). In the top panel of the figure, area 309 represents the vertical slice spanned by the overlapping beams of the forward looking subsystem 111 and area 341 represents the area sensed by the echosounder subsystem 129 at a given instance of time. Processing the data from the forward looking beams provide range and depth of several bottom points ahead of the vessel. Conventional forward looking echosounders just do this for a single beam, generally at 45 degree from the surface. The invention provides depth directly below the vessel from echosounder subsystem 129.

The extent of forward area 309 is related to the shallowest vertical look angle of forward looking subsystem 111. Multiple angles can be selected that are reliable for depth measurements and apply data fitting and filtering algorithms using appropriate outputs from echosounder subsystem 129 as reference to make the output from forward-looking subsystem 111 more reliable. After filtering the measurements, depth information from forward looking subsystem 111 and echosounder subsystem 129 can be integrated to produce an image as shown in bottom panel of FIG. 10.

In certain embodiments, echosounder subsystem 129 looks directly below the vessel (area 341 in FIG. 10) and forward looking subsystem 309 does not look all the way down up to 90 degrees from the surface. So in the most recent measurement of depths, there exists an area which is covered by neither echosounder nor forward looking echosounder. Such area is represented at the bottom of FIG. 10 as a dashed line. The integrated processing uses the correctly selected prior measurements to fill this gap so that user is provided with an image that provides seamless depth information that consists of echosounder output for the area that is directly below and behind the vessel, and forward looking echosounder output for the areas that are well ahead of the vessel. Such processing applies to any in-water targets including fish schools. Both top and bottom panel in FIG. 10 demonstrate fish detection.

In certain embodiments, the invention provides systems and methods for sound speed profile estimation. The operating environment of navigation, survey and recreational sonars change as the vessels travel. Performance of sonars is affected by several parameters of the water on which they operate. Speed of sound under water is one of the most important parameters that has huge impact in sonar performance. Most of the navigation and recreational sonars assume the speed of sound under water as a constant parameter and use a value most appropriate to them. This is a realistic assumption for many applications that do not deal with estimating bathymetric information at longer ranges. Estimated bathymetric information could be corrected if the system can also estimate the sound speed in its surrounding in real time. Most of the sound speed profile (SSP) estimation techniques either use dedicated transmit-receive hardware or assume batch processing. None of these work for a forward looking sonar that would like to estimate sound speed profile in real time as a side job while performing its main task of obstacle detection and bottom mapping.

One optional feature of the invention pertains to estimating the sound speed profile from forward looking or combined forward looking and echosounder data and using those estimates for further processing within the invention or within external systems. No known prior art methods provide for real time estimation of sound speed profile using the data collected by forward looking sonar for obstacle avoidance and bottom mapping. Systems and methods of the invention estimate the sound speed profile in real time, without any dedicated hardware, while the system is doing its main job of obstacle avoidance and bottom mapping. The estimated sound speed can be used to correct depth information measured by the system.

The invention provide systems and methods for estimating a sound speed profile in real time without using dedicated hardware. A system includes a forward looking subsystem 111 integrated with an echosounder 129 and provides a real-time sound speed profile estimation with data from these subsystems and does not require any additional data or subsystems. In certain embodiments, the system has update rate between about 0.1 second and about 10 seconds (e.g., between about 0.5 s and about 2 s, preferably about 1 s). The system provides real time sound speed profile estimation by finishing computations in less than a second (e.g., within milliseconds). Additionally, the system is able to provide sound speed estimation for every sonar ping, that is, every second and it should be numerically stable.

The sound speed profile estimation is fast enough to meet real-world real-time requirements and is numerically stable without requiring reference data like CTD measurements, bathymetric information from GIS databases, etc.

Figure 11:
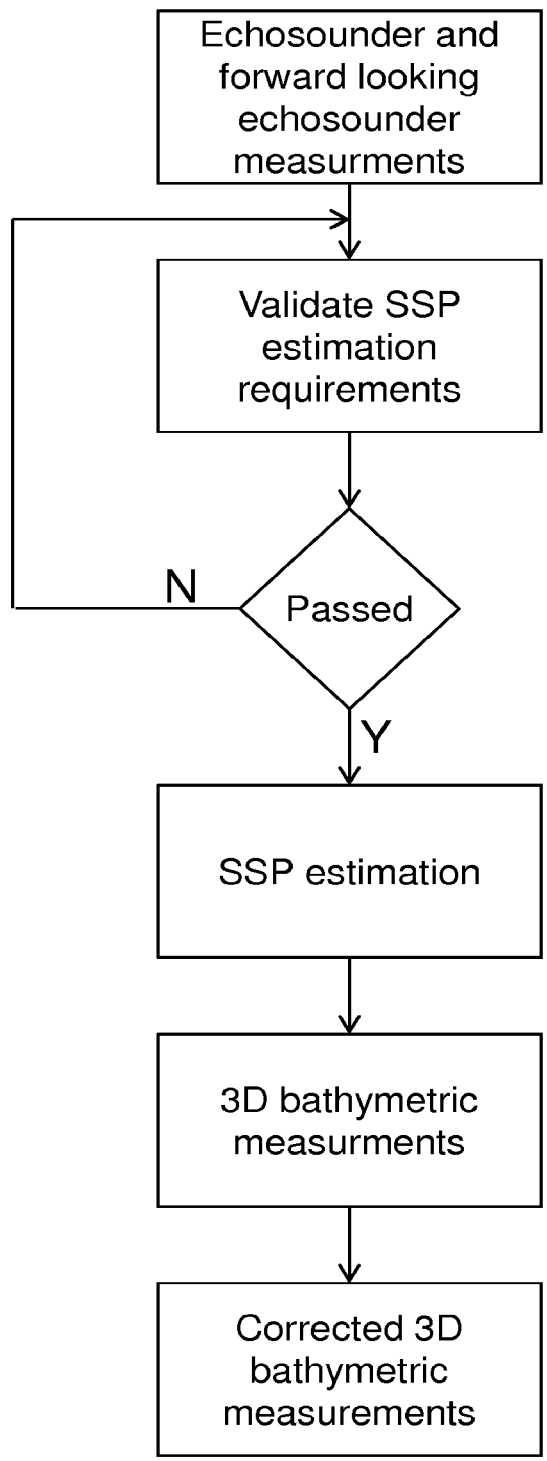
FIG. 11 charts a method of estimating a sound speed profile.

FIG. 11 diagrams a method for sound speed profile estimation. Depth measurements are made below and ahead of vessel 101 using the integrated forward looking subsystem 111 and echosounder subsystem 129. The ranges and depth measurements collected from echosounder and forward looking echosounder are verified against requirements that must be met or passed before sound speed profile estimation process can begin. Once the requirements are passed (i.e., "Passed"=Y), the range and depth measurements are fed to a sound speed profile estimation module. The sound speed profile estimation module implements an optimization algorithm that minimizes the errors between depths derived from forward looking subsystem 111 and echosounder subsystem 129. The solution of the minimization gives an estimate of sound speed profile.

The estimated sound speed profile is used to correct the 3D bathymetric data measured by system 104. The 3D bathymetric data measured by system 104 includes ranges and depths of bottom points and in-water targets measured by the integrated system.

Figure 12:
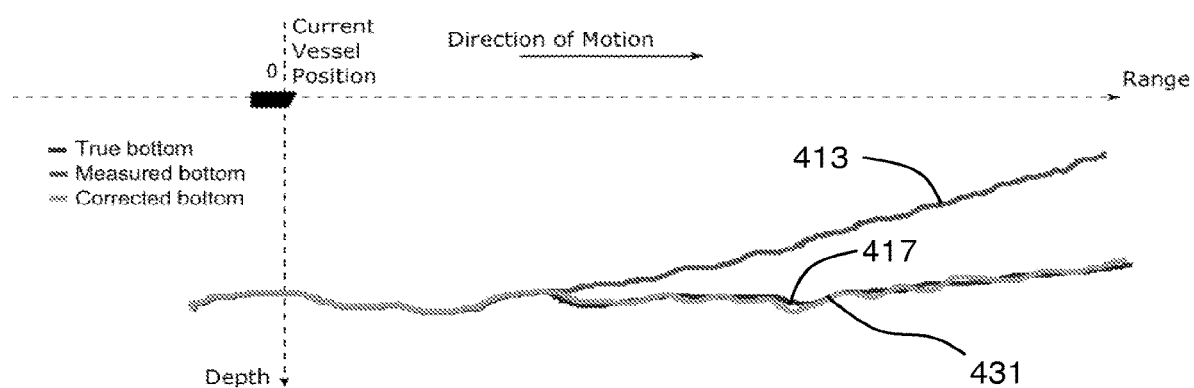
FIG. 12 shows the result of correcting bottom calculations.

FIG. 12 demonstrates a typical scenario of bottom correction in 2D using the estimated sound speed profile. The inaccuracies in the measured bottom 413 originating from assumed constant sound speed profile can be corrected by applying the estimated sound speed profile to measured bathymetric data so that corrected bottom 431 can be forced as closer to true bottom 417 as possible. Once sound speed profile estimation requirements are met once, the estimation and correction process can be performed for every ping. Thus, sound speed profile estimation and correction process is neither spatially nor temporally sparse. This is our major advantage over existing methods.

Additionally, systems and methods of the invention provide displays of integrated data collected through the use of one or more of forward looking subsystem 111, side scanning subsystem 125, and echosounder subsystem 129.

Figure 13:
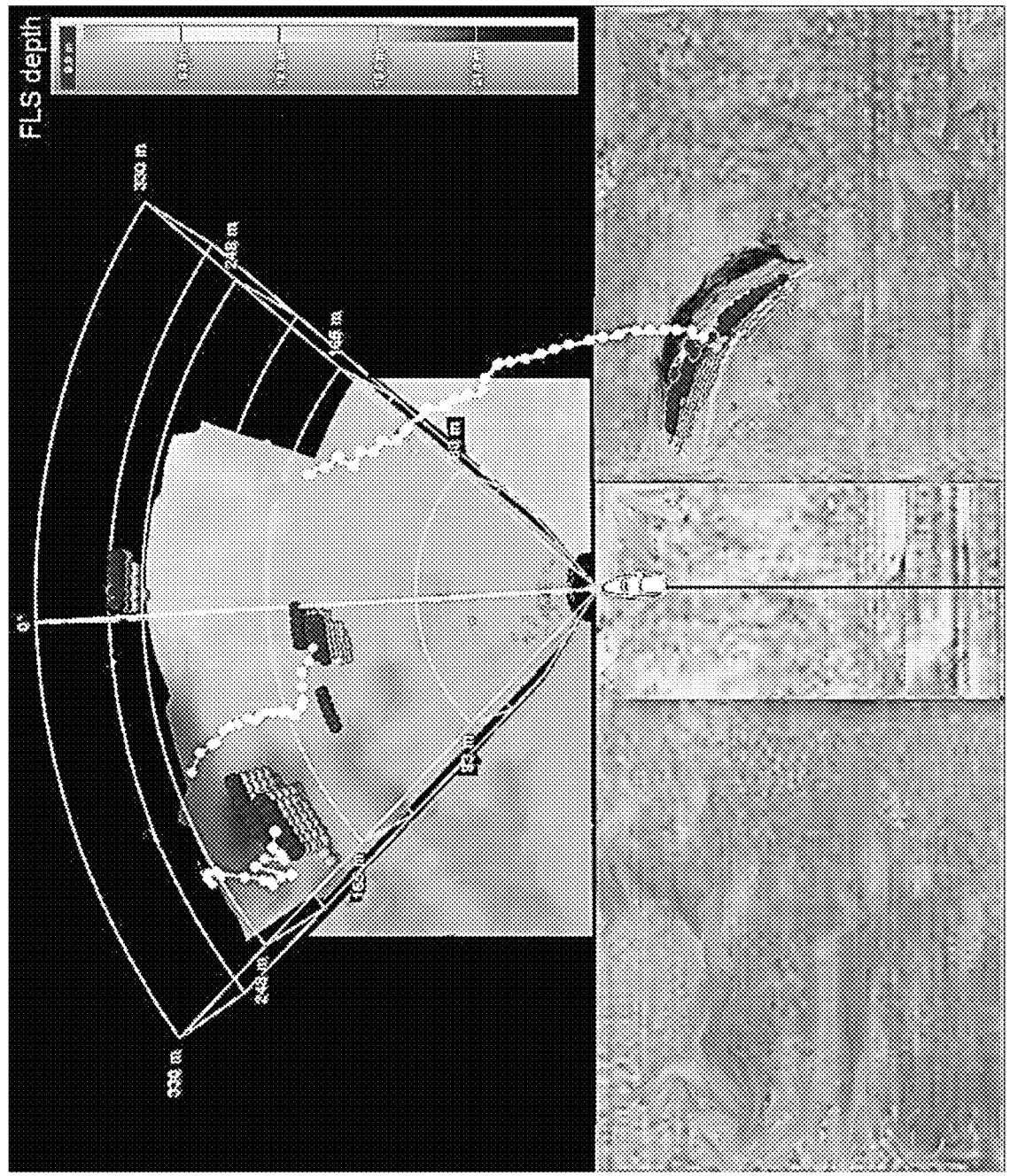
FIG. 13 shows a display according to certain embodiments.

FIG. 13 is a reproduction of one exemplary display from display module 149 in certain embodiments. Preferably, the display includes an echosounder beam waterfall. This can be produced from a single down beam, and may be depth corrected for roll or pitch of vessel (e.g., by processor module 145). An automatic bottom track may be displayed as single depth value. The display may contain a control (e.g., an in-display GUI element such as a touchscreen and pinch gesture, a scroll bar, or button, or a hardware control, such as arrow keys or computer pointing device) that provides zoom from bottom track to altitude above bottom.

The display may also include a side scan beam waterfall image. One or a number of these images may be spatially located and optionally mosaicked (e.g., on top of a base map or image). The display may include a backscatter overlay on top of forward-looking multi beam (FLMB) bathymetry. The display may include mosaicked side scan bathymetry with FLMB bathymetry; highlight targets in side scan imagery that were detected, grouped, or tracked by forward looking sonar; highlight targets in side scan imagery that were NOT detected by forward looking sonar, or a combination thereof.

Forward looking sonar preferably provides the display with at least one 3 dimensional image of bathymetry ahead of vessel 101. The display may further include localization of in-water targets ahead of vessel 101; depth corrected for sound speed profile; mosaic of forward looking sonar bathymetry to create FLMB; 2 dimensional bathymetry slice ahead of vessel along user selected bearing; forward looking echosounder mode from forward-looking data; or a combination thereof.

In the display, all waterfalls can be set to scroll based on location or by time. This allows for fishfinding when stationary. Any beam from any sonar sub-system can be displayed as a waterfall.

Additional methods and devices for use with the invention are discussed in U.S. Pat. No. 8,305,844 to DePasqua; U.S. Pat. No. 8,305,841 to Riordan; U.S. Pat. No. 8,254,208 to Vogt; U.S. Pat. No. 7,315,487 to Zhu; U.S. Pat. No. 5,530,680 to Whitehurst; U.S. Pat. No. 5,158,473 to Parra; U.S. Pub. 2012/0290200 to Kabel; U.S. Pub. 2010/0302907 to Brumley; and U.S. Pub. 2003/0235112 to Zimmerman, the contents of each of which are incorporated by reference in their entirety.

As used herein, the word "or" means "and or or", sometimes seen or referred to as "and/or", unless indicated otherwise.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A sonar system comprising:
   a forward-looking sonar subsystem configured to obtain three-dimensional characteristics about one or more targets;
   a side scan sonar subsystem comprising a transducer that transmits a single beam configured to detect a location of the one or more targets; and
   a processing module operably coupled to the forward-looking sonar subsystem and the side scan sonar subsystem, the processing module configured to apply one or more of the three-dimensional characteristics to the one or more targets obtained by the side scan sonar subsystem.

2. The sonar system of claim 1, wherein the three-dimensional characteristic comprises a height above a seafloor or an altitude above the seafloor.

3. The sonar system of claim 1, further comprising a subsystem controller configured to operate the forward-looking sonar subsystem and the side scan sonar subsystem without interfering with one another.

4. The sonar system of claim 3 wherein the subsystem controller maintains a transmit signal of the forward-looking subsystem that is orthogonal to a transmit signal of the side scan.

5. The sonar system of claim 1, wherein the processing module is operable to extract features about the one or more targets including one or more of target speed, target movement direction, target strength, target shape, target depth and target centroid.

6. The sonar system of claim 1, wherein the processing module is operable to correlate targets detected by forward-looking system with targets detected by the side scan sonar subsystem by means of comparing the detected targets location relative to a fixed frame of reference.

7. The sonar system of claim 1, further comprising an echosounder subsystem.

8. The sonar system of claim 7, wherein the processing module is operable to calculate a depth below the vessel based on a beam range of the echosounder subsystem, a beam orientation of the echosounder subsystem, and reference to a fixed frame of reference as measured by a roll and pitch sensor capable of measuring instantaneous roll and pitch.

9. The sonar system of claim 1, further comprising a display module operably connected to the processing module, the display module configured to display a side scan sonar image comprising the one or more targets highlighted based on the three-dimensional characteristic obtained by the forward-looking sonar subsystem.

10. The sonar system of claim 9, wherein the display module displays a picture comprising one or more sections with time history along a single beam where the vertical axis represents range along the beam direction from vessel and the horizontal axis represents historical time and the user can specify a particular beam from one or more of the sonar subsystems.

11. A sonar system for the hull of a boat, the sonar system comprising:
a forward-looking sonar subsystem configured to obtain three-dimensional bottom mapping data in a forward direction, the three-dimensional bottom mapping data comprising bottom depths that are referenced to a fixed frame of reference; and
a processor configured to use the bottom depths obtained across multiple transmissions of the forward-looking sonar subsystem to calculate a sound refraction index equivalent to a sound speed profile and use the calculated sound refraction index to correct the bottom depths in the three-dimensional bottom mapping data.

12. The sonar system of claim 11, further comprising an echosounder subsystem configured to obtain a bottom depth in a downward-looking direction.

13. The sonar system of claim 12, wherein the processor is further operable to use the calculated sound refraction index to correct the bottom depth obtained by the echosounder subsystem.

14. The sonar system of claim 12, further comprising a subsystem controller configured to operate the forward-looking sonar subsystem and the echosounder subsystem without interfering with one another.

15. The sonar system of claim 11, wherein the processor is configured to provide a sound speed estimation for each transmission and correct the observed bottom depth in real-time.

16. The sonar system of claim 11, wherein the processor is operable to correct the observed bottom depth at a plurality of bottom points in the three-dimensional bottom mapping data.

17. The sonar system of claim 11, where the processor is configured to validate one or more sound speed profile estimation requirements prior to correcting the observed bottom depth.

18. The sonar system of claim 11, wherein the processor is operable to store the calculated sound refraction index in a tangible, non-transitory memory.

19. The sonar system of claim 11, further comprising a display module operably connected to the processor, the display module configured to display the three-dimensional bottom mapping data with corrected bottom depths.

20. The sonar system of claim 11, wherein the forward-looking sonar subsystem has a ping rate of between 0.1 second and 10 seconds.

* * * * *